Jan. 22, 1935.  A. LA CORTE ET AL  1,988,906
CONFECTION CASTING MOLD
Filed April 22, 1933   2 Sheets-Sheet 1
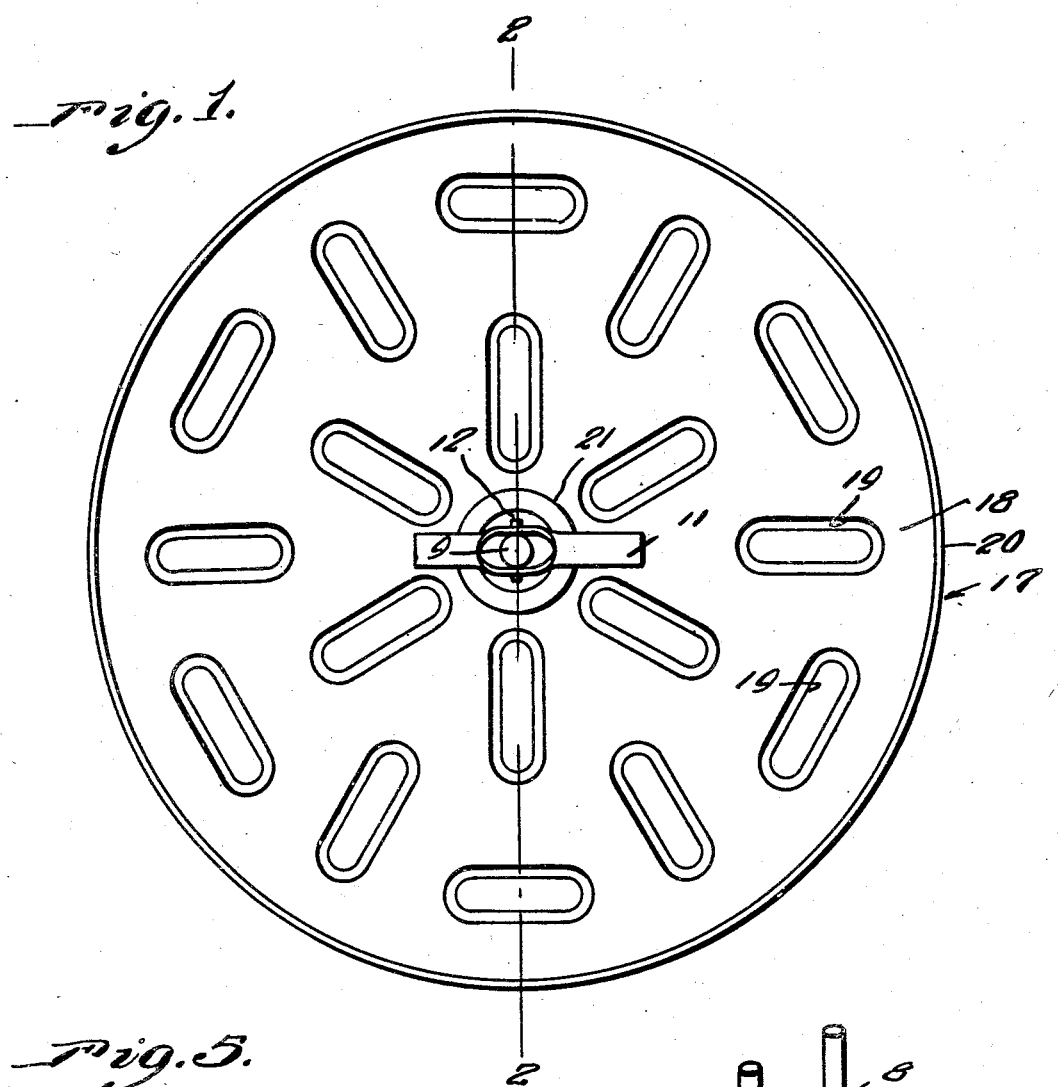
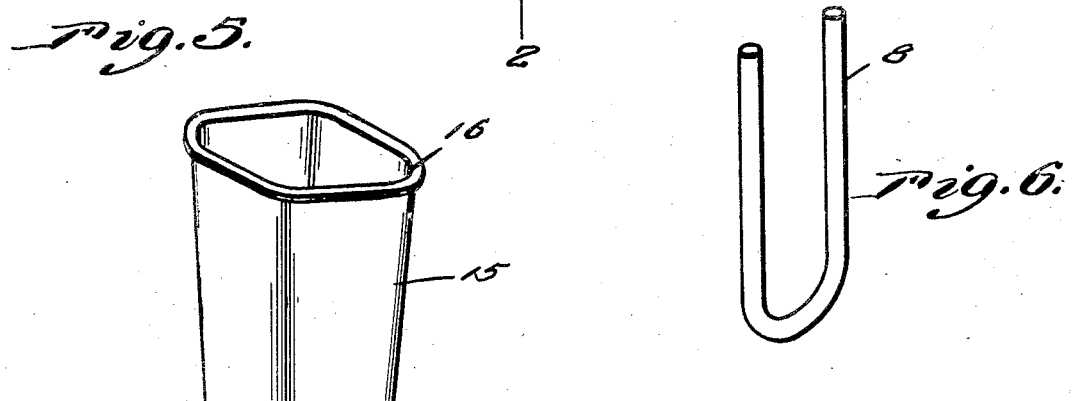
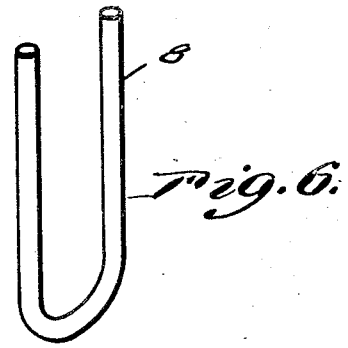
Inventors
Anthony La Corte
T. S. Modzelewski
J. A. Klyczek
By Clarence A. O'Brien
Attorney Jan. 22, 1935.  A. LA CORTE ET AL  1,988,906
CONFECTION CASTING MOLD
Filed April 22, 1933   2 Sheets-Sheet 2
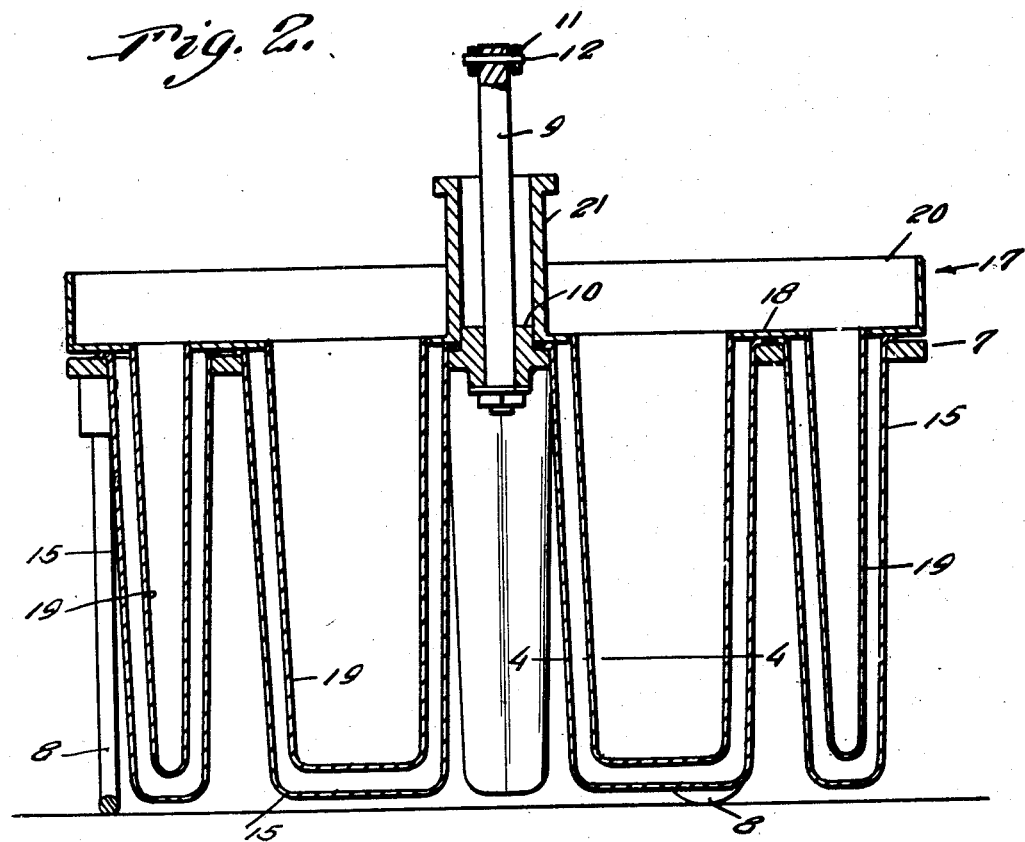
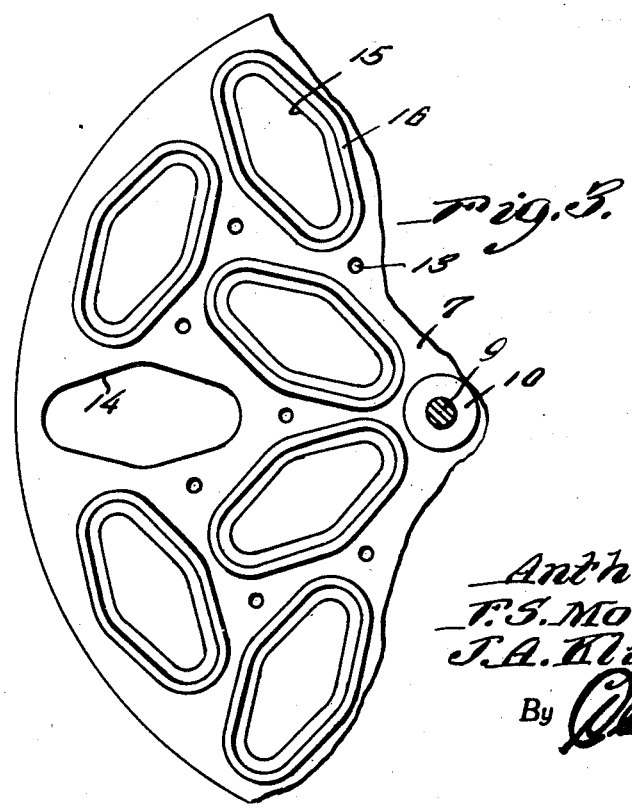
Inventors
Anthony La Corte
F. S. Modzelewski
J. A. Klyczek
By Clarence A. O'Brien
Attorney Patented Jan. 22, 1935

1,988,906

UNITED STATES PATENT OFFICE 1,988,906

CONFECTION CASTING MOLD

Anthony La Corte, Frank S. Modzelewski, and Joseph A. Klycsek, Chicago Heights, Ill.

Application April 22, 1933, Serial No. 667,416

2 Claims. (Cl. 107—19)

This invention relates to a novel mold especially designed and constructed to expedite the formation and manufacture of confection products particularly of the type referred to in the trade as frozen confections.

Briefly stated, the product constructed with the use of this mold is one which embodies a longitudinally elongated cup-like protective casing filled with ice cream frozen on a stick.

In carrying the principles of the present inventive conception into active practice, we have evolved and produced a novel two-part mold which may be said to be made up of inner and outer molds, the outer mold serving to define the external shape of the shell-like casing of the product and the inner mold functioning as a core for internally shaping and gauging the thickness of said casing.

One feature of the invention is predicated upon the specific construction and co-ordination of the two companion mold sections, wherein the inner section is especially constructed to expedite defrosting and expeditious removal to allow the placement of the ice cream fillings and sticks.

Other features and advantages will become more readily apparent from the following description and drawings.

In the drawings:

Figure 1 is a top plan view of the complete mold with the parts in assembled relationship.

Figure 2 is a central vertical sectional view taken approximately on the plane of the line 2—2 of Figure 1.

Figure 3 is a fragmentary sectional and elevational view of the so-called outer or multiple type molds.

Figure 4 is a cross section on the line 4—4 of Figure 2.

Figures 5 and 6 are detail perspective views.

The outer multiple type mold comprises a disc-like plate 7 supported on substantially U-shaped circumferentially spaced legs 8. At its center this plate is provided with an upstanding lifting and handling pin 9 slidably mounted in a collar 10, said pin being provided at its top with a pivotally mounted handgrip 11 which is pivoted on the extreme upper end of the pin as indicated at 12. This not only serves as a handgrip but as a retainer or lock as will be hereinafter described.

The numerals 13 designate small drain perforations. The numerals 14 designate suitably shaped openings to accommodate the outer molds or receptacles 15. These molds are of suitably vertically elongated form and of cup-like design and have resting or suspension flanges 16 at their upper ends which rest removably on the plate 7 in the manner shown.

The inner mold unit or section is distinguished generally by the numeral 17 and this comprises a disc-like plate 18 of a size commensurate with the plate 7 having uniformly arranged hollow depending cores 19 of approximately elliptical cross sectional shape as shown in Figure 4. The numeral 20 designates a marginal rim which co-acts with the plate 18 in forming a pan. The numeral 21 designates a centralized upstanding cylindrical neck which surrounds and seats down over the collar 10. The pin 9 extends up through the neck. Obviously the pan is seated on the plate 7 so that the core members 19 project down into the molding receptacles 15, in spaced relation. This defines the thickness of the shell-like solidified casing or article 22 of the final confectionery product (not shown).

As before implied, the disc 18 and rim 20 constitute a pan for holding water during the process of defrosting the inner molds or cores. Moreover, the neck 21 constitutes a lifting member used to lift the inner mold after the defrosting operation.

In practice, the upper or inner mold unit 17 is removed to uncover the pouring outer molds or receptacles 15. In practice, we pour approximately two and one-half ounces of liquid flavored with concentrated fruit into these molds 15. The material used may be chocolate flavored if desired.

In setting the mold unit 17 in place, it is necessary to turn the pivoted handle 11 on its pivot connection 12 so that it is vertical or approximately aligned with the post or pin 9. Then the unit 17 can be slipped down into place and when seated the handle 11 is brought back to horizontal position. As before indicated, this handle serves as a clamp to hold the two mold sections in assembled relationship. Otherwise, the pressure of the liquid in the outer mold would force the inner one up and out of place.

It is obvious that as the core members 19 are immersed into the liquid filling in the receptacles 15, the filling rises and assumes the shape illustrated in Figure 4. Then the complete assembly is placed in a freezing cabinet until the liquid contents of the mold is sufficiently frozen. Then the device is removed from the cabinet and the pan of the part 17 as well as the cores 19 is filled with water. This will loosen or defrost the inner mold so that it can be extracted. After this, the ice cream fillings are placed in the casing 22 and the sticks (not shown) are inserted and allowed to freeze. At the proper time, the multiple outer mold is immersed in water which loosens the confection products sufficiently to permit expeditious removal and subsequent packaging for sale purposes.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

We claim:

1. A mold assembly of the class described comprising an outer mold embodying a disc-like plate having supporting means and a plurality of openings, a plurality of vertically elongated outer mold receptacles inserted downwardly through said openings and having supporting flanges resting on said plate, a second mold section comprising a disc having an upstanding marginal rim defining a pan, and a plurality of hollow vertically elongated core members carried by and depending from said disc and adapted for telescopic reception in said outer mold receptacle, said plate being provided with a centrally disposed upstanding pin having a pivoted handle on its upper end, said disc being provided with an upstanding tubular lifting neck surrounding said pin, the handle being disposed above said neck.

2. An inner mold and defrosting device of the class described comprising a disc formed with a marginal upstanding rim defining a water containing pan, said disc being formed at its center with a tubular neck having a flange at its upper end, said disc being further formed with integral depending hollow core members of a predetermined shape.

ANTHONY LA CORTE.
FRANK S. MODZELEWSKI.
JOSEPH A. KLYCZEK.